(No Model.)
J. N. TODD & T. GRIFFIN.
CULTIVATOR.
No. 417,607. Patented Dec. 17, 1889.
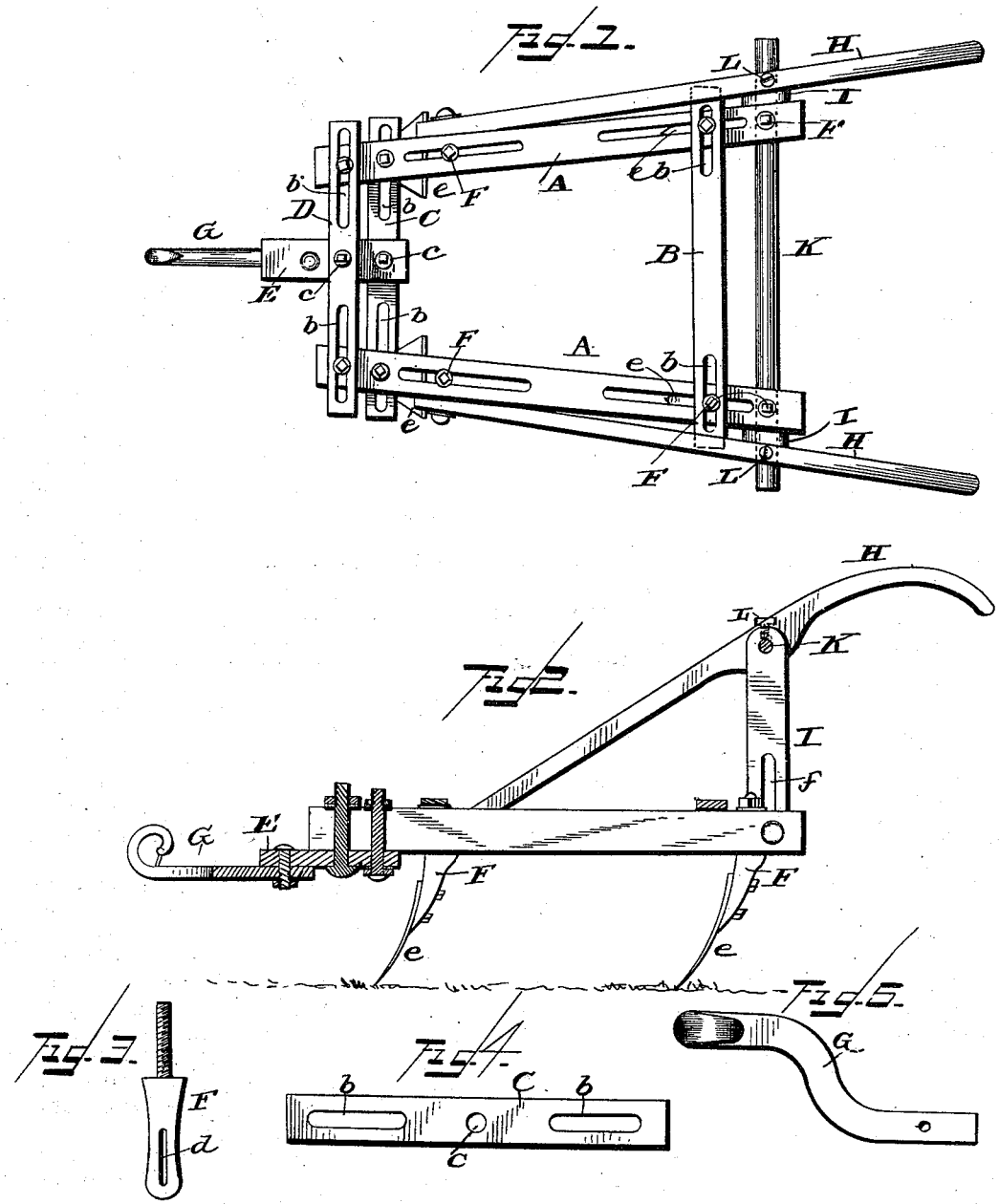
WITNESSES:
F. L. Ourand
C. F. Chisholm
INVENTORS:
John N. Todd 2nd
Thomas Griffin
By Louis Bagger & Co.,
Attorneys
N. PETERS, Photo-Lithographer, Washington, D. C.

UNITED STATES PATENT OFFICE.

JOHN N. TODD AND THOMAS GRIFFIN, OF KILMICHAEL, MISSISSIPPI.

CULTIVATOR.

SPECIFICATION forming part of Letters Patent No. 417,607, dated December 17, 1889.

Application filed July 24, 1889. Serial No. 318,531. (No model.)

*To all whom it may concern:*

Be it known that we, JOHN N. TODD and THOMAS GRIFFIN, both residents of Kilmichael, in the county of Montgomery and State of Mississippi, have invented certain new and useful Improvements in Cultivators; and we do hereby declare that the following is a full, clear, and exact description of the invention, which will enable others skilled in the art to which it appertains to make and use the same.

Our invention relates to improvements in cultivators in which the teeth are attached to adjustable beams; and the objects of our improvements are, first, to provide means for adjusting the beams; second, to provide means for adjusting the plows or teeth, and, third, to provide an adjustable draw attachment. We attain these objects by the mechanism illustrated in the accompanying drawings, in which—

Figure 1 represents a plan view. Fig. 2 is a longitudinal sectional view. Fig. 3 represents a detached plow-foot. Fig. 4 represents one of the slotted cross-bars, and Fig. 5 illustrates the shape of the draw-hook.

Like letters of reference denote corresponding parts in all the figures.

The beams A A are fastened together and laterally adjusted by means of the cross-bars B C D, each having slots $b\ b$ at either end. Cross-bar B is bolted through the slots $b\ b$ near the rear end and on top of the beams A A. Cross-bar D is similarly bolted at the front end and on top of the beams A A, while cross-bar C is bolted to the under side of the beams A A just back of cross-bar D. By loosening the bolts which fasten cross-bars B, C, and D to the beams A A the beams can be adjusted to any desired width. Through the centers of the cross-bars C and D are holes $c\ c$, by means of which draw-bar E is firmly bolted. The draw-hook G is fastened to draw-bar E.

The plow-feet F F F F are bolted to the beams, and may be adjusted, if found desirable, either backward or forward, by slots or series of holes in the beams A A. Each plow-foot F is made with a slot $d$, by means of which the teeth or plows $e\ e\ e\ e$ may be vertically adjusted. It will be seen that teeth of any desired shape may be attached.

The pivoted handles H H, slotted standards I I, and cross brace or rod K are adapted to be fastened in the ordinary manner, except that the cross-rod K slides through holes in the standards and handles as the beams are adjusted, and each handle H H is provided with a set-screw L, which fastens cross-rod K when adjusted to prevent lateral play, and the standards I I are vertically adjustable by means of the slots $f\ f$.

It will be seen that in using the cultivator astride a drill it possesses the advantage of having no center beam to hide the drill from the operator or to rub over the plants.

If it is desired to use but one horse and still to run the cultivator astride the drill, the draw-hook G may be made with a lateral bend, as in Fig. 5, and draw-bar E may, if found desirable, be bolted through the slots at one side of cross-bars C and D rather than through the holes $c\ c$.

Having thus described our invention, we claim and desire to secure by Letters Patent of the United States—

The combination of the frame comprising the slotted or apertured and adjustable beams and the slotted adjustable cross-bars, the pivoted handles, the slotted and adjustable rear standards, the adjustable cross-brace, and the set-screws adapted to fasten the handles on the cross-brace in its adjusted position, substantially as set forth.

In testimony that we claim the foregoing as our own we have hereunto affixed our signatures in presence of two witnesses.

JOHN N. TODD.
THOMAS GRIFFIN.

Witnesses:
W. M. TROTTER,
E. H. SPENCER.